United States Patent
Lui et al.

(10) Patent No.: US 10,329,435 B2
(45) Date of Patent: Jun. 25, 2019

(54) ELECTROTHERMAL COATING WITH NANOSTRUCTURES MIXTURE AND METHOD FOR MAKING THE SAME

(71) Applicant: University of Utah Research Foundation, Salt Lake City, UT (US)

(72) Inventors: Feng Lui, Salt Lake City, UT (US); Chao Hui, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 428 days.

(21) Appl. No.: 14/789,617

(22) Filed: Jul. 1, 2015

(65) Prior Publication Data

US 2016/0185983 A1    Jun. 30, 2016

Related U.S. Application Data

(60) Provisional application No. 62/019,738, filed on Jul. 1, 2014.

(51) Int. Cl.
  *C09D 5/24*    (2006.01)
  *H05B 3/56*    (2006.01)
  (Continued)

(52) U.S. Cl.
  CPC ............. *C09D 5/24* (2013.01); *C09D 7/61* (2018.01); *C09D 7/70* (2018.01); *H05B 3/56* (2013.01); *H05B 2214/04* (2013.01)

(58) Field of Classification Search
  CPC ... C09D 5/24; C09D 7/61; C09D 7/70; C09D 7/1216; C09D 7/1297; H05B 3/14;
  (Continued)

(56) References Cited

U.S. PATENT DOCUMENTS

| | | | | |
|---|---|---|---|---|
| 6,762,237 B2 * | 7/2004 | Glatkowski | ........... | B82Y 10/00 524/495 |
| 8,581,158 B2 * | 11/2013 | Heintz | ................ | C08F 259/08 219/482 |

(Continued)

FOREIGN PATENT DOCUMENTS

| KR | 20120034370 | 12/2012 |
|---|---|---|
| WO | WO 2013/100550 | 7/2013 |

OTHER PUBLICATIONS

Potts et al., Graphene-Based Polymer Nanocomposites, Polymer, vol. 52, Dec. 2, 2010, 5-25; Elsevier.

(Continued)

*Primary Examiner* — Shawntina T Fuqua
(74) *Attorney, Agent, or Firm* — Thorpe, North & Western, LLP

(57) ABSTRACT

An electrothermal coating can include a nanostructure mixture randomly dispersed in a polymer matrix with more than one type of low-dimensional nanostructure. These types of low-dimensional nanostructures can include a combination of a nanospheroid plus one or both of a linear nanostructure and a planar nanostructure. Useful conductivity is achieved, while concentration of the mixed nanostructures is within the cured polymer composite coating being below the percolation limit of each individual carbon nanostructure type, alone, within an identical polymer matrix.

19 Claims, 8 Drawing Sheets

(51) Int. Cl.
*C09D 7/61* (2018.01)
*C09D 7/40* (2018.01)

(58) Field of Classification Search
CPC ...... H05B 3/347; H05B 3/56; H05B 2214/04; H05B 2203/017
See application file for complete search history.

(56) References Cited

U.S. PATENT DOCUMENTS

| | | |
|---|---|---|
| 2003/0224168 A1 | 12/2003 | Mack et al. |
| 2006/0041050 A1 | 2/2006 | Manane et al. |
| 2006/0270777 A1 | 11/2006 | Wise et al. |
| 2008/0286559 A1 | 11/2008 | Lee et al. |
| 2009/0072408 A1 | 3/2009 | Kabir et al. |
| 2009/0118420 A1 | 5/2009 | Zou et al. |
| 2009/0142579 A1 | 6/2009 | Smith |
| 2009/0261303 A1 | 10/2009 | Kim et al. |
| 2010/0099782 A1 | 4/2010 | Lee et al. |
| 2010/0105834 A1 | 4/2010 | Tour et al. |
| 2010/0126981 A1 | 5/2010 | Heintz et al. |
| 2010/0133483 A1 | 6/2010 | Nakashima et al. |
| 2010/0159126 A1 | 6/2010 | Wautier |
| 2010/0160503 A1 | 6/2010 | Nakagawa et al. |
| 2011/0134655 A1 | 6/2011 | Ohtani et al. |
| 2011/0163290 A1 | 7/2011 | Rueckes et al. |
| 2012/0114947 A1 | 5/2012 | Jenninger et al. |
| 2012/0178877 A1 | 7/2012 | Rathje et al. |
| 2012/0256440 A1 | 10/2012 | Johannboeke et al. |
| 2012/0298396 A1 | 11/2012 | Hong et al. |
| 2012/0298928 A1 | 11/2012 | Rowe et al. |
| 2013/0035419 A1 | 2/2013 | Chan et al. |
| 2014/0151596 A1* | 6/2014 | Hirsch .................. C09D 175/04 252/75 |

OTHER PUBLICATIONS

Khosla et al., Preparation, characterization and Micromolding of Multi-Walled Carbon Nanotube Polydimethylsiloxane Conducting Nanocomposite Polymer, Materials Letters, vol. 63, Feb. 28, 2009, 1203-1206; Elsevier.

Kim et al., Surface Modifications for the Effective Dispersion of Carbon nanotubes in Solvents and Polymers, Carbon, vol. 50, Issue 1, Jan. 2012, 3-33; Elsevier.

Moisala et al., Thermal and Electrical Conductivity of Single- and Multi-Walled Caton Nanotube-Epoxy Composites, Composites Science and Technology, vol. 66, Dec. 15, 2005 1285-1288; Elsevier.

Singh et al., Optical and Electrical Characterization of Conducting Polymer-Single Walled Carbon Nanotube Composite Films, Carbon, vol. 46, Apr. 12, 2008, 1141-1144; Elsevier.

Sundaray et al., Electrical Conductivity of a Single Electrospun Fiber of Poly (Methyl Methacrylate) and Multiwalled Carbon Nanotube Nanocomposite, Applied Physics Letters, vol. 88, Apr. 5, 2006, 143114-143114-3.

Chatterjee et al.; "Size and Synergy Effects of Nanofiller Hybrids Including Graphene Nanoplatelets and Carbon Nanotubes in Mechanical Properties of Epoxy Composites"; Carbon; (Jul. 25, 2012); pp. 5380-5386; vol. 50, Issue 15; <doi: 10.1016/j.carbon.2012.07.021 >.

Kumar et al.; "Dynamic Synergy of Graphitic Nanoplatelets and Multi-Walled Carbon Nanotubes in Polyetherimide Nanocomposites"; Nanotechnology; (Feb. 15, 2010); 9 pages; vol. 21, 105702; <doi: 10.1088/0957-4484/21/10/105702 >.

Li et al.; "Hybrid Nanocomposites Containing Carbon Nanotubes and Graphite Nanoplatelets"; Materials Science and Engineering A; (Jun. 15, 2008); pp. 660-663; vol. 483-484; <doi: 10.1016/j.msea.2006.08.145 >.

Maiti et al.; "Graphene Nanoplate and Multiwall Carbon Nanotube-Embedded Polycarbonate Hybrid Composites: High Electromagnetic Interference Shielding With Low Percolation Threshold"; Polymer Composites; (2016); pp. 2058-2069; vol. 37; Society of Plastics Engineers; <doi: 10.1002/pc.23384 >.

Safdari et al.; "Synergistic Electrical and Thermal Transport Properties of Hybrid Polymeric Nanocomposites Based on Carbon Nanotubes and Graphite Nanoplatelets"; Carbon; (Jul. 18, 2013); pp. 111-121; vol. 64; <doi: 10.1016/j.carbon.2013.07.042 >.

Yu et al.; "Enhanced Thermal Conductivity in a Hybrid Graphite Nanoplatelet—Carbon Nanotube Filler for Epoxy Composites"; Advanced Materials; (Oct. 23, 2008); pp. 4740-4744; vol. 20; <doi: 10.1002/adma.200800401 >.

* cited by examiner

ELECTROTHERMAL COATING WITH NANOSTRUCTURES MIXTURE AND METHOD FOR MAKING THE SAME

RELATED APPLICATION(S)

This application claims priority to U.S. Provisional Application No. 62/019,738 filed on Jul. 1, 2014, which is incorporated herein by reference.

GOVERNMENT INTEREST

This invention was made with government support under Grant No. DE-FG02-04ER46148 awarded by the U.S. Department of Energy. The government has certain rights in the invention.

FIELD OF THE INVENTION

This invention relates to the field of electrothermal coatings and polymer composites including low dimensional carbon nanostructures. Accordingly, the invention involves the fields of nanotechnology, electrical engineering, physics, and materials science.

BACKGROUND

Electrothermal (ET) coatings can be used as an alternative to metal-wire resistor heating cables in a wide range of applications such as warming and de-icing. State of the art coatings include various composites of electrically and thermally conductive fillers dispersed within a polymer matrix. State of the art fillers include metal particles and, in some cases, mixtures of metal particles with a single low dimensional carbon (LDC) nanostructure such as carbon black or carbon nanotubes each of which has a conductivity similar to metal. There are limitations inherent in using metal particles as fillers. First, there is a minimum amount of metal particles that can be dispersed into a polymer solution. Metal particles which are isolated from one another such that gaps form between the metal particles can lead to poor conduction in the gaps between the metal particles. Second, ET coatings made of carbon black and metal particles typically have low sticking coefficients and can only be applied to limited substrate surfaces. Third, metal particles are expensive, have a large coefficient of thermal expansion, and can corrode. These drawbacks can lead to deteriorating the stability and shortening of the lifetime of the coated device.

SUMMARY

Therefore, the inventors have recognized the need for a highly conductive ET coating, that can be applied to a variety of substrates, and is less costly to manufacture than traditional metal particle based coatings. Accordingly, invention embodiments provide an electrothermal (ET) coating comprising a nanostructure mixture randomly dispersed in a polymer matrix. More specifically, the nanostructure mixture can comprise at least two low-dimensional nanostructures while the nanostructure mixture can be below a percolation limit of each of the at least two low-dimensional nanostructures within the polymer matrix when the composition is cured. In one embodiment, the low-dimensional nanostructures can be at least one of a nanospheriod, a linear nanostructure, a planar nanostructure, and combinations of these materials. In another embodiment, the polymer matrix can comprise at least one of polysiloxane (PSX), siloxane monomers, polyacrylate (acrylic latex), polyacetylene (PAC), polyphenylene vinylene (PPV), polyurethane (PU), polyaniline (PANI), polythiophene (PT), polypyrrole (PPY), polyphenylene sulfide (PPS), and polyquinoline (PQ).

Also presented herein, is a method of manufacturing the coating described above.

Further presented herein, is a method of heating a surface using the coating described above. The method can comprise applying the coating as described above to a surface, connecting the surface to a power source, and running a current from the power source through the coating.

There has thus been outlined, rather broadly, the more important features of the invention so that the detailed description that follows may be better understood, and so that the present contribution to the art may be better appreciated. Other features of the present invention will become clearer from the following detailed description of the invention, taken with the accompanying drawings and claims, or may be learned by the practice of the invention.

BRIEF DESCRIPTION OF THE DRAWINGS

Features and advantages of the invention will be apparent from the detailed description that follows, and which taken in conjunction with the accompanying drawings, together illustrate features of the invention. It is understood that these drawings merely depict exemplary embodiments and are not, therefore, to be considered limiting of its scope. Furthermore, it will be readily appreciated that the components, as generally described and illustrated in the figures herein, could be arranged and designed in a wide variety of different configurations.

Figure 1:
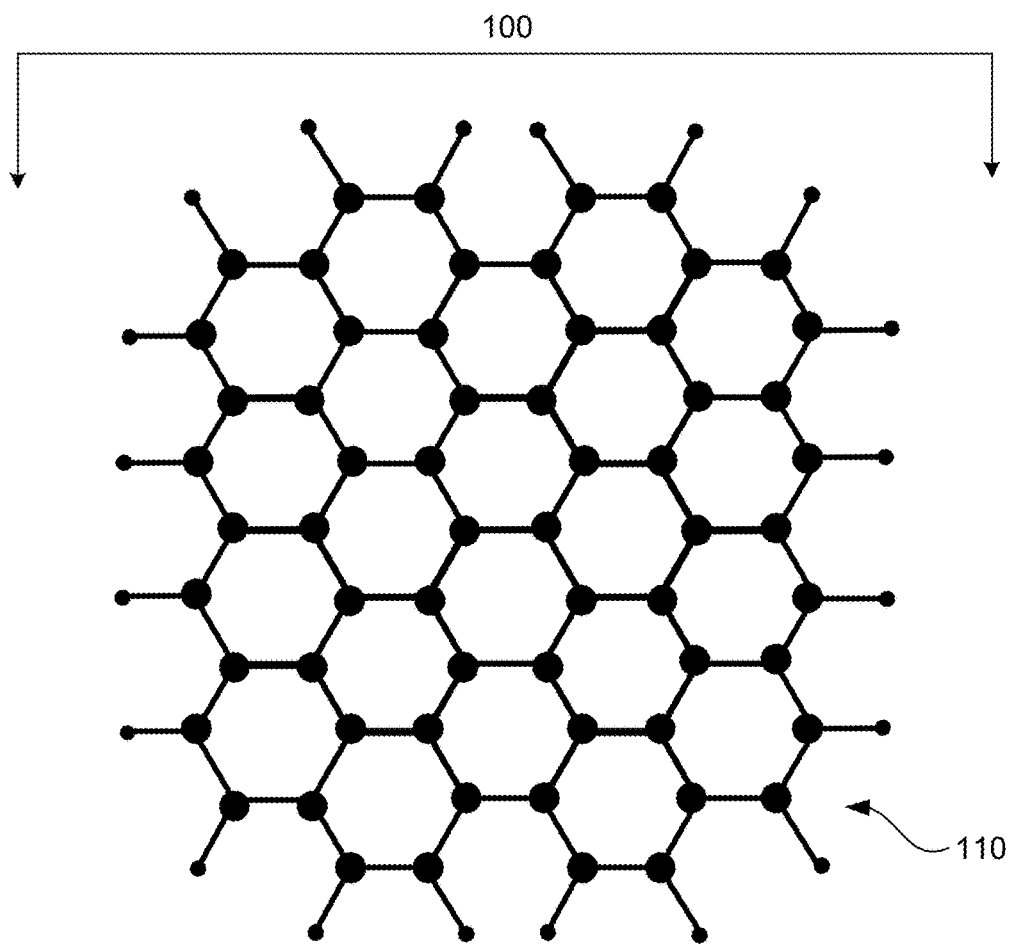
FIG. 1 is a schematic illustrating an exemplary low-dimensional carbon nano structure, 2D graphene, which is a highly conductive material.

These drawings are provided to illustrate various aspects of the invention and are not intended to be limiting of the scope in terms of dimensions, materials, configurations, arrangements or proportions unless otherwise limited by the claims.

DETAILED DESCRIPTION

Reference will now be made to exemplary invention embodiments and specific language will be used herein to describe the same. It will nevertheless be understood that no limitation in scope is thereby intended. Alterations and further modifications of inventive features described herein, and additional applications of inventive principles which would occur to one skilled in the relevant art having possession of this disclosure, are to be considered as inventive subject matter. Further, before particular embodiments are disclosed and described, it is to be understood that this disclosure is not limited to the particular process and materials disclosed herein as such may vary to some degree. It is also to be understood that the terminology used herein is used for the purpose of describing particular embodiments only and is not intended to be limiting.

Definitions

In describing and claiming the present invention, the following terminology will be used.

The singular forms "a," "an," and "the" include plural referents unless the context clearly dictates otherwise. Thus, for example, reference to "a particle" includes reference to one or more of such materials and reference to "subjecting" refers to one or more such steps.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, the term "about" refers to a degree of deviation based on experimental error typical for the particular property identified. The latitude provided the term "about" will depend on the specific context and particular property and can be readily discerned by those skilled in the art. When used in connection with a numerical value, the term "about" is used to provide flexibility and allow the given value to be "a little above" or "a little below" the specific number stated. Further, unless otherwise stated, the term "about" shall expressly include "exactly," consistent with the discussion below regarding ranges and numerical data.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

In this disclosure, "comprises," "comprising," "comprised," "containing" and "having" and the like can have the meaning ascribed to them in U.S. Patent law and can mean "includes," "including," and the like, and are generally interpreted to be open ended terms. The term "consisting of" is a closed term, and includes only the methods, compositions, components, systems, steps, or the like specifically listed, and that which is in accordance with U.S. Patent law. "Consisting essentially of" or "consists essentially" or the like, when applied to devices, methods, compositions, components, structures, steps, or the like encompassed by the present disclosure, refer to elements like those disclosed herein, but which may contain additional structural groups, composition components, method steps, etc. Such additional devices, methods, compositions, components, structures, steps, or the like, etc., however, do not materially affect the basic and novel characteristic(s) of the devices, compositions, methods, etc., compared to those of the corresponding devices, compositions, methods, etc., disclosed herein. In further detail, "consisting essentially of" or "consists essentially" or the like, when applied to the methods, compositions, components, systems, steps, or the like encompassed by the present disclosure have the meaning ascribed in U.S. Patent law and is open-ended, allowing for the presence of more than that which is recited so long as basic or novel characteristics of that which is recited is not changed by the presence of more than that which is recited, but excludes prior art embodiments. In this specification when using an open ended term, like "comprising" or "including," it is understood that direct support should be afforded also to "consisting essentially of" language as well as "consisting of" language as if stated explicitly and vice versa. Each term provides support for the others as if expressly stated.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein with respect to volume fraction, "cured concentration" refers to the volume fraction filler in the polymer matrix after the polymer has been cured and/or substantially all volatile compounds have escaped and LDN has a fixed position within the polymer matrix. Thus, a cured concentration indicates a final composition as applied to a substrate after polymeric curing or drying of the coating. As used herein with respect to a nanostructure, "low dimensional nanostructure" is any one of 0 dimensional (0D), 1 dimensional (1D), or 2 dimensional (2D) nanometer scale structures.

A "nanostructure" refers to material sizes which enables the material to exhibit properties within at least one dimension that are intermediate between the property of a single atom or molecule and that of the corresponding bulk material. Further, nanostructures can have a smallest physical dimension (e.g. width, length, thickness, diameter, etc) which is less than about 900 nm, and in some cases can be less than about 100 nm. The properties of particular interest herein are electrical conductivity, electrical percolation limits, and thermal conductivity. For example, in the case of a carbon nanotube, a 1D nanostructure, the nanotube acts as a quantum waveguide limiting conductivity to one dimension, along the length of the tube. This results in a value for conductivity in that dimension far exceeding the conductivity of a bulk material of the same element, such as graphite. In the case of graphene, a 2D nanostructure, the conductivity is limited to two dimensions, forming a conductive plane. In the context of nanostructure polymer composite, a 0D nanostructure can function as a conductive island within the polymer matrix which can facilitate tunneling of charges between nearest neighboring nanostructures within the polymer matrix. Conduction can be achieved when an 1D or 2D structure makes contact to multiple 0D nanostructures, acting as a conductive bridge.

As used herein with respect to a nanostructure, "nanospheroid" refers to a nanometer scale structure that is substantially spherical in shape. Typically a nanospheroid can have a diameter between about 4 nm and about 500 nm, and a diameter ratio in orthogonal directions less than about 0.5 or greater than about 2.

As used herein with respect to a nanostructure, "linear nanostructure" refers to a nanometer scale structure that is substantially linear in shape, has an aspect ratio from about 2 to about 50, and most often from about 3 to about 20.

As used herein with respect to a nano structure, "planar nano structure" refers to a nanometer scale structure that is substantially planar in shape.

As used herein with respect to forming a nano-composite, "dispersion" refers to the introduction of nanostructures to a liquid polymer matrix. This can be an initial step in the process of creating the composite coating in which the distribution of the nanostructures can be controlled as either random or ordered.

As used herein with respect to nanostructure concentration, "percolation limit concentration" refers to the volume fraction of nanostructures within the polymer below which the electrical conductivity of the composite falls to a value within about 5% of the electrical conductivity of the polymer alone. The behavior of conductivity with respect to volume fraction is analyzed by percolation theory, which includes multiple types. Two known examples are statistical and kinetic. Statistical percolation can be where substantially homogeneously structured and randomly distributed filler particles fixed in the matrix form percolating paths. Statistical percolation theory generally follows the relation: $\sigma = \sigma_0 (\Phi - \Phi_c)^t$, where $\sigma$ represents electrical conductivity, $\Phi$ represents volume fraction filler, $\Phi_c$ represents the volume fraction that is the percolation limit concentration, and t is expected to range typically from about 1.3 to about 4 and is dependent on the dimensionality of the filler (0D, 1D, 2D, 3D etc). This relation can be representative of experimental data as it does not consider aspect ratio of 1D systems. For composites filled with carbon nanotubes, an 1D nanostructure with an aspect ratio of $\eta = L/W$, statistical $$\phi_c \sim \frac{1}{2\eta},$$

a relation derived from the concept of excluded volume. With respect to the present invention, the percolation limit concentration of a low dimensional carbon nanostructure-polymer composite can be reduced to below the statistical percolation limit by preparing the nanostructure filler as a random mixture of 0D with any one or more of 1D and 2D nanostructures.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Electrothermal Coating with Nanostructures Mixture and Method for Making the Same In one embodiment, there is provided a multi-component nanocomposite electrothermal (ET) coating. The coating can comprise multiple low dimensional carbon (LDC) nanostructures dispersed in polymer solvents. In one embodiment, the multiple LDC nanostructures can be at least two low-dimensional nanostructures. In such an embodiment, the cured concentration of the nanostructure mixture can be below a percolation limit of each of the at least two-dimensional nanostructures.

Figure 2:
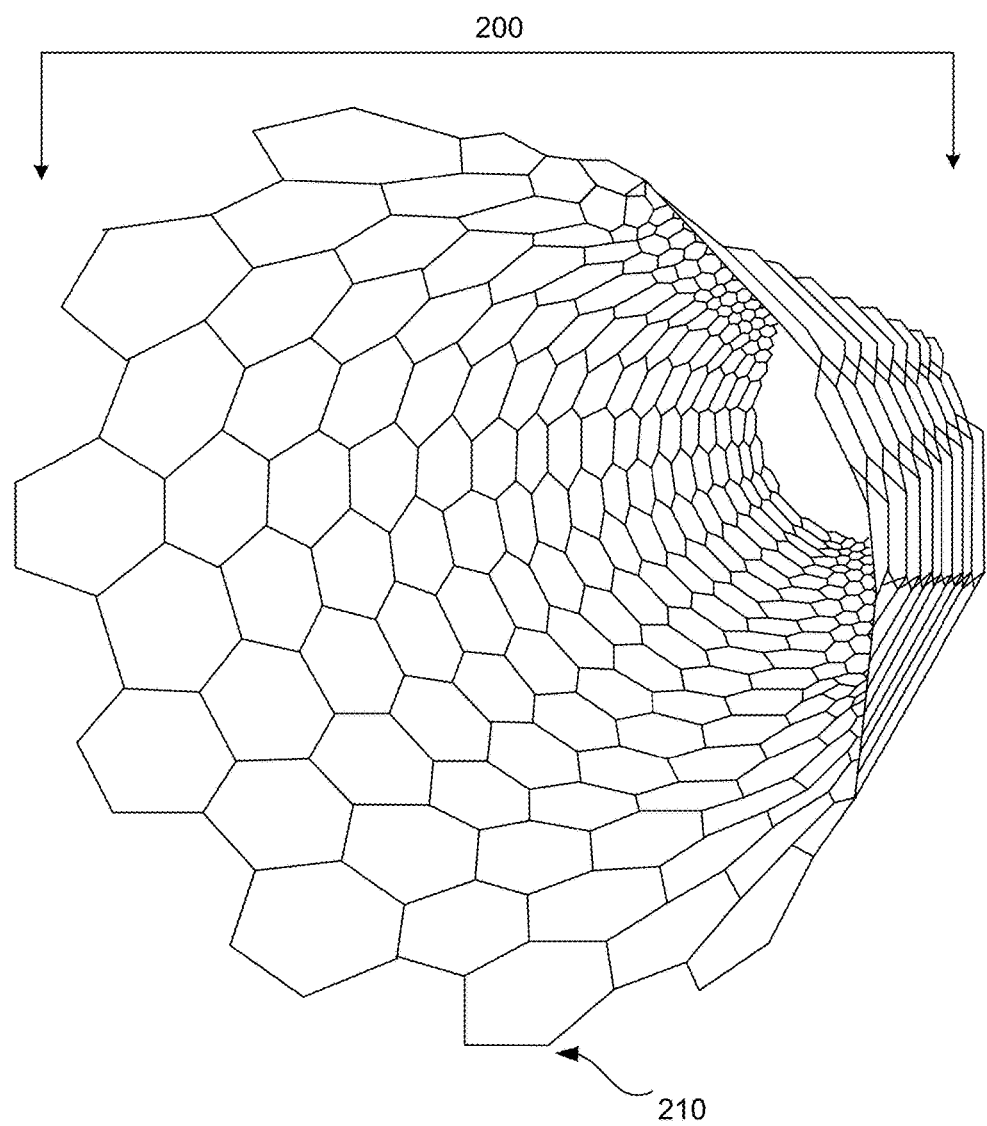
FIG. 2 is a schematic illustrating another exemplary low-dimensional carbon nano structure, 1D carbon nanotubes, which is highly conductive material.

The ET coating can be comprised of any combination of low dimensional carbon nanostructures. In one embodiment, the low dimensional nanostructures can be selected from 0D carbon nanostructures, 1D carbon nanostructures, 2D carbon nanostructures, or a combination thereof. A non-limiting list of examples of 0D carbon nanostructures can include carbon black, fullerenes, hollow graphitic carbon nanospheres (HCN), porous carbon nanospheres, carbon onions, schwartzites, and carbon nanocages. A non-limiting list of examples of 1D carbon nanostructures can include carbon nanotubes (CNT), single walled CNT (SWCNT), multiple walled CNT (MWCNT), meta-carbon nanotubes, chiral carbon nanotubes, doped carbon nanotubes, fullerene nanowires, and doped fullerene nanowires. A non-limiting list of examples of 2D carbon nanostructures can include graphene, graphene oxide (GO), intercalated graphene, exfoliated graphene, and carbon nanotubes in planar arrays. FIG. 1 schematically illustrates a low dimensional 2D graphene nanostructure 100, comprised of bonded carbon atoms 110. FIG. 2 schematically illustrates a low dimensional 1D carbon nanotube 200, comprised of bonded carbon atoms 210.

The nanostructure types in the ET coating can include any combination of a nanospheroid, a linear nanostructure, and/or a planar nanostructure. For example, in one aspect, the nanostructure mixture can consist of a nanospheroid and a linear nanostructure. Alternatively, in another aspect, the nanostructure mixture can consist of a nanospheroid and a planar nanostructure. Yet, as another alternative, the nanostructure mixture can consist of a nanospheroid, a linear nano structure, and a planar nano structure. Regardless, concentration of the mixed nanostructures within the cured polymer composite coating is below the percolation limit of each individual carbon nanostructure type, alone, within an identical polymer matrix. Any variety of low-dimensional nanostructures can be used. The nanospheroid can be any one or a combination of carbon black, fullerenes, hollow graphitic carbon nanospheres (HCN), porous carbon nanospheres, carbon onions, schwartzites, doped fullerenes, carbon bucky balls, and carbon nanocages, although other nanospheroids can be suitable. The linear nanostructure can be any one or combination of carbon nanotubes (CNT), single walled CNT (SWCNT), multiple walled CNT (MW-CNT), meta-carbon nanotubes, chiral carbon nanotubes, doped carbon nanotubes, fullerene nanowires, and doped fullerene nanowires, although other linear nanostructures can also be used. The planar nanostructure can be any one or combination of graphene, graphene oxide (GO), intercalated graphene, exfoliated graphene, and carbon nanotubes in planar arrays, although other planar nanostructures can also be used.

Figure 3:
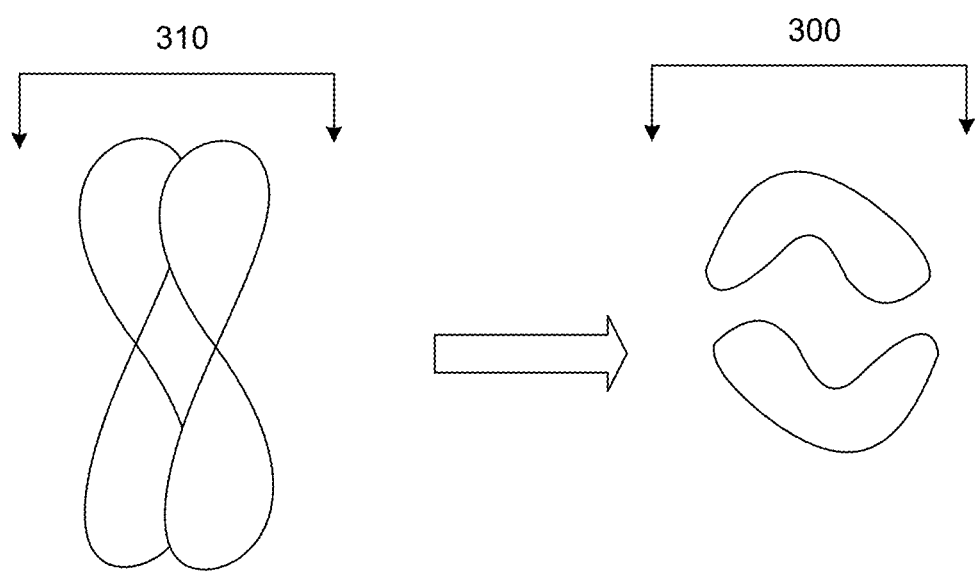
FIG. 3 is a schematic illustration of two p-orbitals forming a π-bond.

When the ET coating comprises multiple LDC nanostructures the inter-carbon nanostructure can exhibit better conductivity than the conductivity that can be achieved by an inter-metal particle in a polymer solution. Carbon nanostructures can have a cross-linked carbon network that facilitates electron conductivity. The electron conductivity can be similar to or greater than that of metal particles because of the highly conductive π-conjugated network. Within each dispersed carbon nanostructure, electron transport can be mediated by the conjugated π-electron network that can extend over several adjacent atoms. This network can be formed by multiple π-bonds. As shown in FIG. 3, a single π-bond 300, can be formed by two p-orbitals 310, that create a covalent π-bond. Multiple π-bonds within the ET coating can form the conjugated network. The π-electrons in the conjugated π-bonds can be delocalized over several adjacent atoms. Without being limited to any particular theory, it is thought that the delocalization can result in the highly conductive nature of the LDC nanostructure. This delocalization is postulated to enable hopping between nanostructures, facilitating conduction when used as a filler in a composite. In one example, the conjugated network can form a hexagonal honeycomb lattice. Table 1 compares the typical electrical conductivity of graphene and CNT with some well-known metal conductors:

TABLE 1

Electrical conductivity of some good conductors.

| Material | Conductivity (S/m) |
|---|---|
| CNTs | $10^6$-$10^7$ |
| Graphene | $2.5 \times 10^7$ |
| Silver | $6.30 \times 10^7$ |
| Copper | $5.96 \times 10^7$ |
| Aluminum | $3.5 \times 10^7$ |
| Platinum | $9.4 \times 10^6$ |

There are some distinct advantages of using carbon nanostructures in place of metal particles to make ET coatings. First, carbon nanostructures can be more dispersible in polymer solutions than metal particles, possibly, because of the better bonding compatibility between carbon and polymer than a metal and polymer. The increased dispersibility can allow for a greater amount of carbon nanostructures to be incorporated into the ET coating. As the amount of carbon nanostructures in the coating increases, the conductivity of the ET coating also increases. The ET coatings disclosed herein can be tuned resulting in a coating conductivity over a much wider range. Also, the resulting ET coating can be highly adaptive, exhibiting a very good sticking property, and can be applicable to a variety of different surfaces including ceramics, wood, cloth, paper, etc. In one example, the compositions can have a sticking coefficient of 0.75 to 1.0, and in some cases from 0.9 to 1.0 at operating temperature conditions. Moreover with proper choice of composition and processing, a very good connectivity and overall conductivity can be achieved in between the dispersed carbon nanostructures in the polymer solution.

Figure 4A:
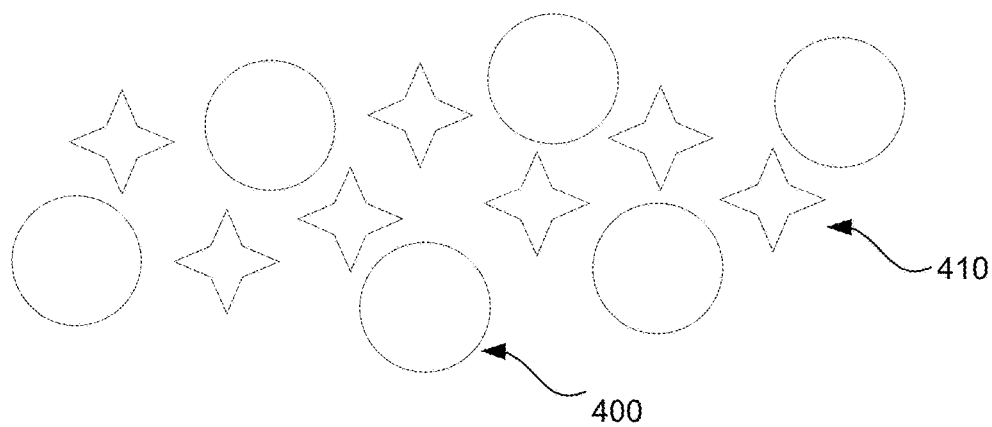
FIG. 4A is a schematic illustrating: a weak contact of carbon black particles and metal particles in accordance with the prior art.
Figure 4B:
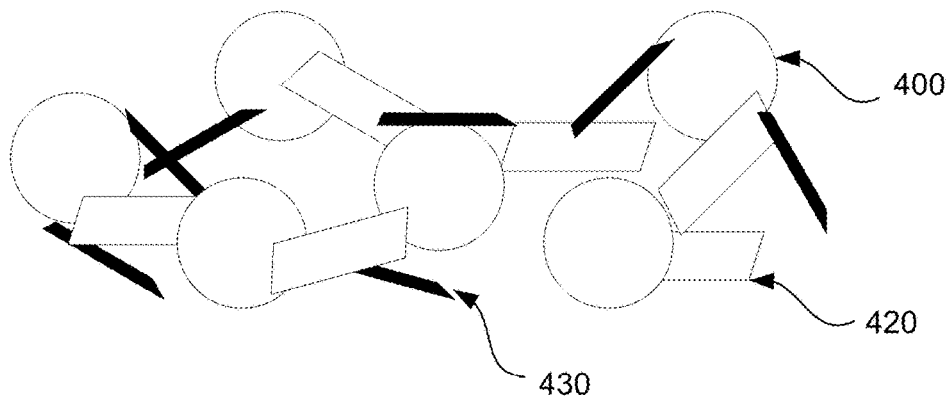
FIG. 4B is a schematic illustrating good contact of cross-linked 0D, 1D and 2D carbon nanostructures in accordance with one aspect of the present disclosure.

The coating conductivity can be significantly improved by the use of a mixture of carbon nanostructures with components of the mixture having distinct dimensionalities. An example can be a mixture of 2D graphene with 1D CNT. The improvement appears to arise from a better cross-link between the nanostructures and, hence, better inter-nanostructure electron hopping. FIG. 4a shows that if only 0D nanostructures (such as carbon black 400, and metal particles 410,) are used, the inter-structure conduction can only occur if every two structures are in direct contact, i.e., the overall concentration must go beyond the percolation limit. In contrast, FIG. 4b shows that if 0D (fullerene) 400, 1D (CNT) 420, and 2D (graphene) 430 nanostructures are all mixed together, the inter-structure conduction can occur among all the cross-linked nanostructures even if some of them are not in direct contact. In other words, even when the concentration of fullerene is well below the percolation limit, two separated fullerenes can be "electronically" bridged by a CNT and/or graphene, so that the composite still exhibits a good overall conductivity. Furthermore, because the CNT and graphene are higher-dimensional structures having a much larger size than the 0D fullerene, the concentration of additional CNT/graphene needed to bridge fullerene can be very low. It is theorized that this cross-linked network mechanism provides the fundamental working principle of the disclosed highly conductive ET coating technology.

Either during the process of dispersion, or after the carbon nanostructures are dispersed within the polymer matrix, any or all of these 0D, 1D, and 2D carbon nanostructures can be strained, affecting their individual conductivities and the conductivity of the composite. In one embodiment, only a portion of the nanostructures are strained. In another embodiment, all of the nanostructures are strained. In yet other embodiments, none of the nanostructures are strained. The amount of straining can vary based on the desired use of the ET coating.

The quantity of nanostructures within the polymer matrix can vary based on the type of nanostructures in the ET coating and the desired use. While the percolation limit can vary, percolation limits from about 6 to about 12 weight percent can be achieved for mixtures of graphene and polysiloxane. As a general guideline, concentrations of nanostructures can range from about 5 wt. % to about 20 wt. %. In another embodiment, the concentration of nanostructures can range from about 3 wt. % to about 50 wt. %. In yet another embodiment, the concentration of nanostructures can range from about 10 wt. % to about 30 wt. %. Similarly, ratios of 0D to 1D and 2D nanostructures can range from about 1 wt. % to about 50 wt. %. The percolation limit concentration of any low dimensional carbon nanostructure-polymer composite can be reduced to below the statistical percolation limit by preparing the nanostructure filler as a random mixture of 0D with any one or more of 1D and 2D nanostructures. Regardless of the concentration of the mixed nanostructures within the cured polymer composite coating, the concentration can be below the percolation limit of each individual carbon nanostructure type, alone, within an identical polymer matrix.

The polymer matrix can be any non-conductive polymer that allows for electron transfer between the nanostructures. The exact polymer used will depend on the intended use of the ET coating. In one embodiment, it can be desirable to use a polymer which retains the low-dimensional carbon nanostructure, allows for a reduced composite percolation limit, and exhibits the desired properties for a particular application (e.g. substrate adherence, viscosity, heat stability, etc). In one aspect, the polymer matrix can be a fluid polymer which allows the coating to be applied to a suitable substrate via a coating process. Non-limiting examples of suitable polymers can include polysiloxane (PSX), siloxane monomers, polyacrylate (acrylic latex), polyacetylene (PAC), polyphenylene vinylene (PPV), polyurethane (PU), polyaniline (PANI), polythiophene (PT), polypyrrole (PPY), polyphenylene sulfide (PPS), polyquinoline (PQ), and their monomers. In one aspect, the polymer can be at least one of polyacrylate and polyacetylene.

The ET coating can include a variety of additives. Additives may include colorants, UV stabilizers, UV inhibitors, solvents, plasticizers, other stabilizers, thinners, and/or additives. In one specific embodiment the ET coating can exclude metal particles.

The ET coating described above can be created by combining the carbon nanostructures in the polymer matrix. Typically, this can involve simple mixing of the LDN with a polymer precursor. However, other methods can be used.

Figure 5A:
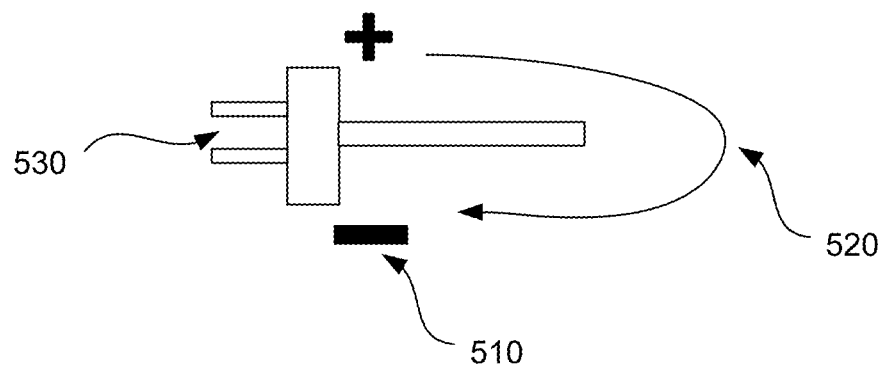
FIGS. 5A and 5B schematically illustrates current flow in a traditional circuit cable (5A) verses an ET coating cable (5B) as described herein.
Figure 5B:
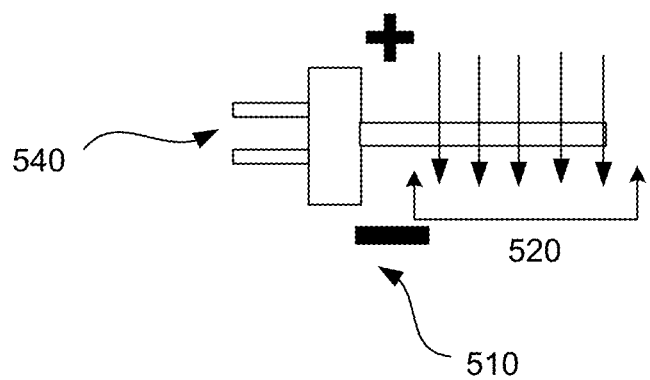

The ET coating can be manufactured in a variety of embodiments. In one embodiment, the coating can be in the form of a liquid formulation. In another embodiment, the ET coating can be manufactured in the form of a homogenous wire with an insulative coating. In yet another embodiment, the ET coating can be manufactured in the form of a sheet. One distinct advantage of the ET coating disclosed herein over traditional metal particle ET coatings is that the coating can be customized for the target application. This customization is possible because the LDC coating is a homogenous mixture and electron transfer can occur between the gaps/bridges of the LDC nanotubes. For example when the coating is manufactured as a homogenous wire, the wire can have an adjustable length with attachable and/or detachable segments. FIG. 5 schematically illustrates current flow in a traditional circuit cable verses the ET coating cable disclosed herein. As shown in FIG. 5 electrical current 510, current flows 520 around the traditional deicing cable 530. By contrast current flows 520, through the ET coating cable disclosed herein, 540. Specifically, the metal wire/traditional circuit cable is simply a resistant wire using a serial circuit. The length is fixed. For example, the commercial metal-wire deicing cable may be either 25 ft. long or 50 ft. long. If only 10 ft. is desired, there is no way for the user to cut the cable shorter. Furthermore, to maintain the same power per length, the 25 ft. long and 50 ft. long metal-wire deicing cables are actually made with different wire thickness. Otherwise the power of the 25 ft. long cable would be half of that of the 50 ft. cable. This makes the manufacture of the metal-wire deicing cable more complicated and expensive. By contrast, the multicomponent nanocomposite ET deicing ribbons use a parallel circuit, which is expandable and detachable. Consequently, its installation length can be customized for the target application. It is installed by simply connecting individual segments, each 0.5-1.0 ft. long, with the same power per length. The total power is simply the multiple times of the power of each segment. This not only conserves material and energy, as customers are not required to purchase more length than is needed, but also makes the manufacture of deicing ribbon simpler and cheaper. Also, the multicomponent nanocomposite ET deicing ribbon is about four times lighter than the metal-wire deicing cable, which suggests additional savings of soft cost in transportation and installation. The ET coating can also be customizable when formulated as an insulative sheet. The insulative sheet the ET coating sheet can be cut by the user and adjusted to fit the desired application size. In one embodiment, the ET coating sheet can be manufactured as a kit that includes two removable rivet leads. The rivet leads can be placed by in any location on the sheet that allows the user such to customize the desired direction of the electric flow that through the sheet. It is anticipated that the embodiment of the ET coating will vary based on the intended application.

The ET coating can be formulated to be adhered to one or more specific substrates. Potential substrates can include materials that are typically not suited for use with traditional metal particle ET coatings. The substrate types can be any combination of materials selected from ceramic, wood, cloth, epoxy film, artificial leather, fiberboard, paper, and the like. In one specific embodiment, the substrate is a ceramic tile. In another embodiment, the substrate is a cloth article such as a piece of clothing.

The ET coating can be applied to the substrate using any number of techniques. The exact technique used will vary based on the form of the ET coating, the intended use, and the substrate. Exemplary application methods can include but are not limited to, spray coating, gap coating, gravure coating, inkjet coating, immersion coating, and the like. For example, the ET coating can be applied to a back surface of ceramic tiles which include electrical connectors to an electrical source or an adjacent tile having a similar ET coating. With respect to a cloth article the coating can be applied to the individuals fibers before the article is woven or can be interweaved with the fibers in the article.

Also presented herein is a method of heating a surface. The method can comprise applying a coating of the nanostructure mixture randomly dispersed in a polymer matrix, as described above, to the surface of the article; connecting the surface to an electric current power source; and running the electric current through the coating. In one embodiment, the temperature range that the surface is heated to can be controlled by varying the nanostructure within the composition.

It will be readily apparent to those skilled in the art that various changes and modifications of an obvious nature may be made without departing from the spirit of the disclosed embodiments, and all such changes and modifications are considered to fall within the scope of the technology as recited herein, including in the appended claims. One example of such changes and modifications could include, but are not limited to, incorporating additional components into the ET coatings and/or applying the ET coating to a substrate other than those exemplified herein.

EXAMPLES

The following examples illustrate embodiments of the present disclosure that are presently best known. However it is to be understood that the following are only exemplary or illustrative of the application of the principles of the present disclosure. Numerous modifications and alternative compositions, methods, and systems may be devised by those skilled in the art without departing from the spirit and scope of the present disclosure. The appended claims are intended to cover such modifications and arrangements. Thus, while the present disclosure has been described above with particularity, the following examples provide further detail in connection with what is presently deemed to be the most practical embodiment.

Example 1—Radiant Heat Floor Tiles

Specifically for the radiant heat applications, three composites of the ET coatings were applied directly to the back of a commercial floor tile. The composites were created using the following method and tested for temperature achieved over a period of time.

Figure 6:
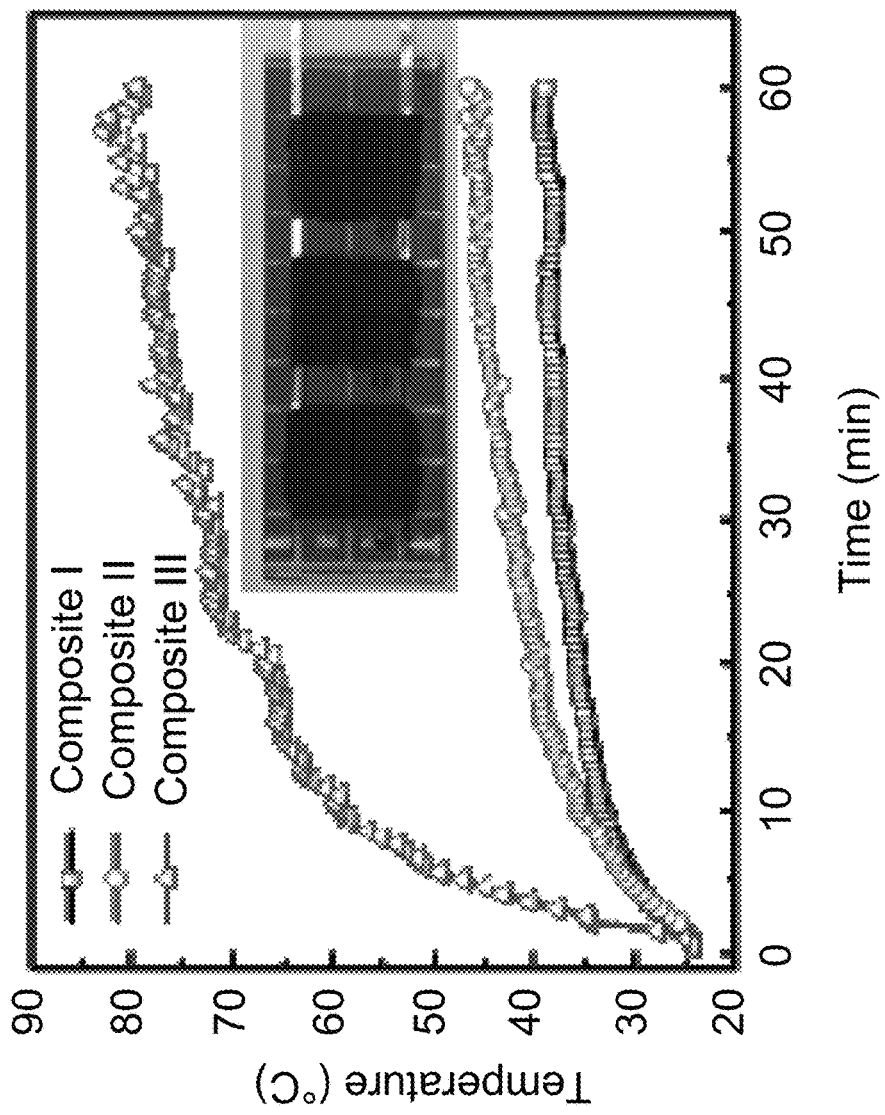
FIG. 6 shows the conductivity of ceramic floor tiles in a graph of temperature vs. time curve of the front side and back side of an ET tile.

Inset photos in FIG. 6 show a front side and back side of the ET tile, with temperature control at 45° C. on two different positions of a 1 ft by 1 ft ET tile. As shown in FIG. 6 the conductivity of the coated floor tiles was found to be highly tunable over a wide range, a non-limiting example ranged from $10^{-6}$ S to 0.1 S (i.e. for 2D), by varying the nano-composite compositions. This in turn enabled the coating to achieve a highly controllable heating temperature, a non-limiting example in the range of 40° C. to 80° C. using either 110V AC or 12 to 24V DC power input, making them ideally suitable for in-door radiant heat systems. For example, FIG. 6 shows the temperature vs. time curve for the three different compositions of nanocarbon composite coatings (Composites I, II, and II). In general, the temperature rose quickly at the beginning, taking about 5-10 minutes to reach a relatively stable temperature, and then increased very slowly afterwards. Compositions I, II, and III exhibited a stable temperature of substantially 35° C., 45° C., and 80° C., respectively.

Figure 7A:
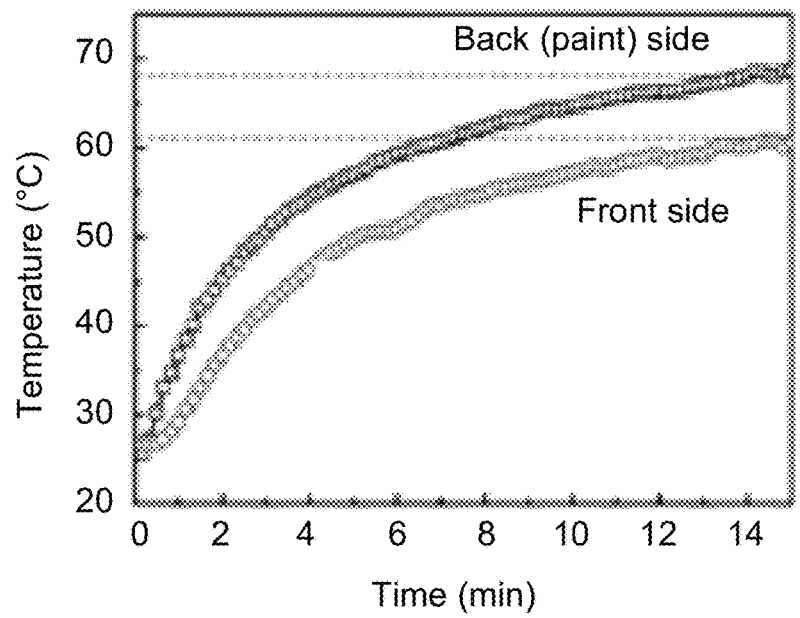
FIG. 7A is a graph of temperature difference across composite tiles.
Figure 7B:
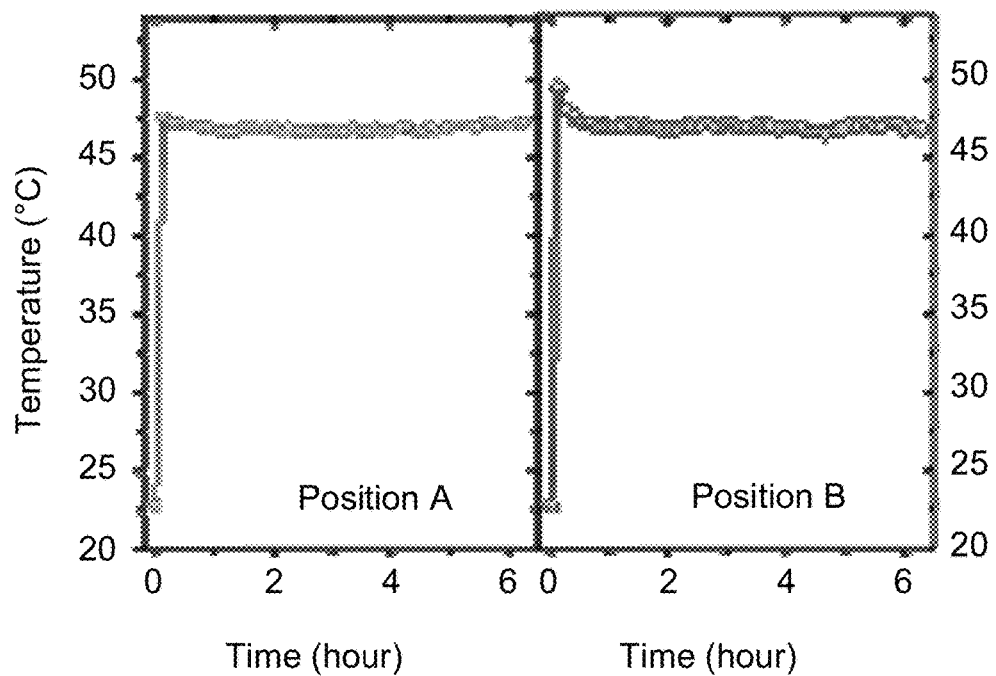
FIG. 7B is a graph of temperature as a function of time at two different positions.

In tests conducted so far, a small temperature difference of substantially 5° C. was found between the front and the back side of the coated tile. FIGS. 7A and 7B schematically shows the temperature difference across Composite tiles I-III. The temperature was found to be uniform when the temperature of more than one position on the tile was measured. This is significant, considering the coating on the tile was not necessarily applied at a uniform thickness, as it was manually hand-brushed onto the tile. These tests have been repeated for hundreds of times and hours, and the multicomponent nanocomposite ET coated tiles consistently showed good and uniform electro-thermal performance.

Example 2—Deicing Ribbon/Mat

Figure 8A:
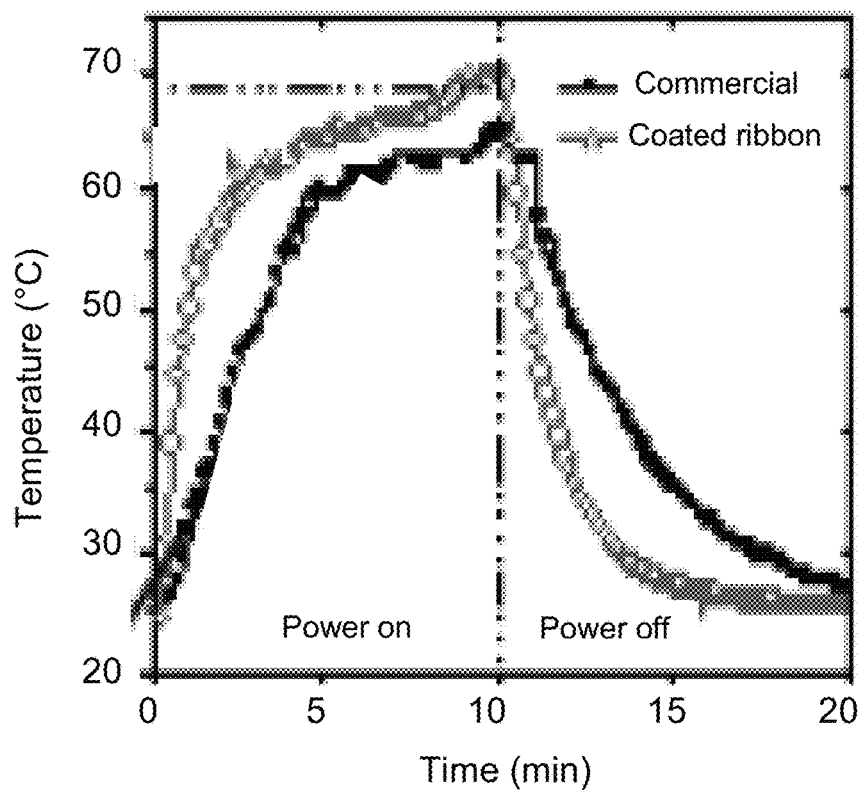
FIGS. 8A and 8B are graphs of temperature performance of a commercial metal-wire deicing cable used on a roof and a coated ribbon in accordance with the methods disclosed herein.
Figure 8B:
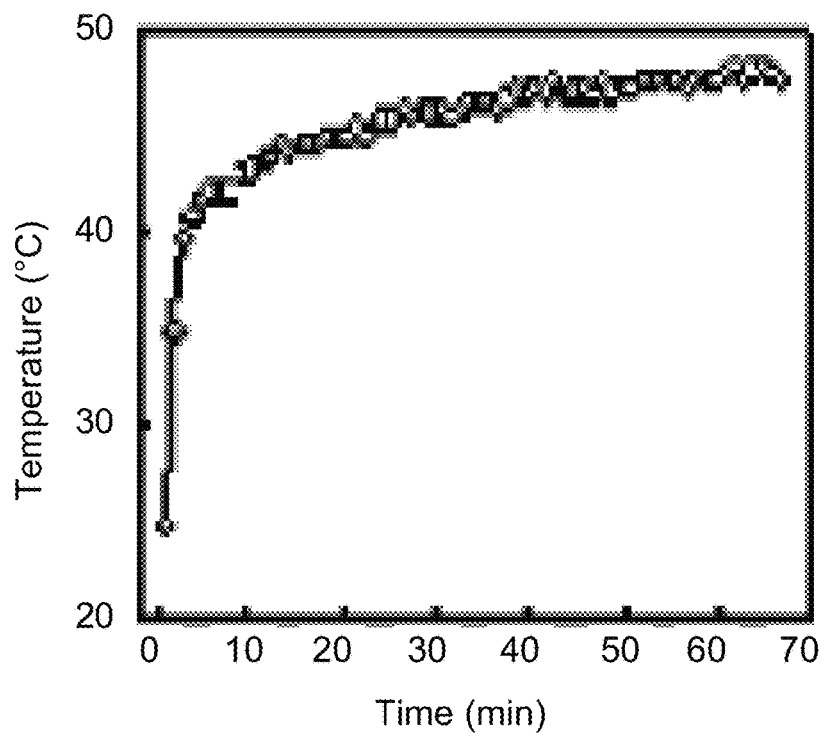

An ET coating created in accordance with the methods described herein was applied to ceramic papers and epoxy films in order to create coated ribbons and mats. By varying the nanocomposite compositions, the conductivity of the coatings was readily tunable over a wide range, a non-limiting example ranging from $10^{-4}$ S to 0.1 S. Controlling conductivity within this range enables control of heating temperature of the ribbons and mats to between 7° C. and 49° C., using standard 120V AC power input, making them ideally suitable for out-door deicing applications. As a feasibility test to confirm the working principle, the ET coatings were purposely tuned to fabricate deicing ribbons that closely match the energy consumption of a 5 W/ft. commercial metal-wire deicing cable. FIGS. 8A and 8B schematically shows the temperature performance of a commercial metal-wire deicing cable versus the temperature performance of the coated ribbon created in accordance with the methods disclosed herein.

The results show that the coated ribbon created in accordance with the methods disclosed herein reaches a higher temperature when the electric current is turned on and cools faster when the electric current is turned off. In addition, the multicomponent nanocomposite ET coated deicing ribbons can be made with much lower material cost than the metal deicing cables, and are much lighter, only about one-fourth of the weight of the metal cables. Another major advantage of the multicomponent nano-composite ET deicing ribbon over the conventional metal-wire deicing cable is that, by employing a different circuitry, it has an adjustable length with attachable and detachable segments of 0.5-1.0 ft. each while the conventional deicing cable has to come with a fixed length. This translates into significant savings in materials and energy, as well as ease of installation.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein. The principles and concepts presented herein are not to be limited, except as set forth by the claims below.

What is claimed is:

1. A method of heating a surface comprising:
    applying a coating of a nanostructure mixture randomly dispersed in a polymer matrix to the surface, wherein the nanostructure mixture comprises at least two types of low-dimensional nanostructures, wherein the coating is electrically conductive, and wherein a cured concentration of the nanostructure mixture is below a percolation limit of at least one of the at least two types of low-dimensional nanostructures within the polymer matrix;
    connecting the surface to an electric current power source; and
    running the electric current through the coating to heat the surface.

2. The method of claim 1, wherein a temperature range that the surface is heated to can be controlled by varying the nanostructure composition.

3. The method of claim 1, wherein the at least two types of low-dimensional nanostructures are selected from the group consisting of a nanospheriod, a linear nanostructure, a planar nanostructure, and combinations thereof.

4. The method of claim 1, wherein the nanostructure mixture consists of a nanospheroid and a linear nanostructure.

5. The method of claim 1, wherein the nanostructure mixture consists of a nanospheroid and a planar nanostructure.

6. The method of claim 1, wherein the nanostructure mixture consists of a nanospheroid, a linear nanostructure, and a planar nanostructure.

7. The method of claim 1, wherein the nanostructure mixture comprises a nanospheroid selected from the group consisting of carbon black, fullerenes, hollow graphitic carbon nanospheres (HCN), porous carbon nanospheres, carbon onions, schwartzites, and carbon nanocages.

8. The method of claim 1, wherein the nanostructure mixture comprises a linear nanostructure selected from the group consisting of carbon nanotubes (CNT), single walled CNT (SWCNT), multiple walled CNT (MWCNT), meta-carbon nanotubes, chiral carbon nanotubes, doped carbon nanotubes, fullerene nanowires and doped fullerene nanowires.

9. The method of claim 1, wherein the at least two types of low-dimensional nanostructures comprises at least one planar nanostructure selected from the group consisting of graphene, graphene oxide (GO), intercalated graphene, exfoliated graphene, and carbon nanotubes in planar arrays.

10. The method of claim 1, wherein any of the nanostructures in the polymer matrix are strained.

11. The method of claim 1, wherein all of the nanostructures in the polymer matrix are strained.

12. The method of claim 1, wherein none of the nanostructures in the polymer matrix are strained.

13. The method of claim 1, wherein the polymer matrix is a fluid polymer.

14. The method of claim 1, wherein the polymer matrix comprises at least one of polysiloxane (PSX), siloxane monomers, polyacrylate (acrylic latex), polyacetylene (PAC), polyphenylene vinylene (PPV), polyurethane (PU), polyaniline (PANT), polythiophene (PT), polypyrrole (PPY), polyphenylene sulfide (PPS), and polyquinoline (PQ).

15. The method of claim 1, wherein the polymer matrix further includes colorants, UV stabilizers, solvents, plasticizers, other stabilizers, thinners and additives.

16. The method of claim 1, wherein the polymer matrix is adapted to adhere to multiple substrate types.

17. The coating of claim 16, wherein the substrate types to which the polymer matrix is adapted to adhere to includes at least one of ceramic, wood, cloth, epoxy film, artificial leather, fiberboard, and paper.

18. The method of claim 1, wherein the polymer matrix is adapted to adhere to commercial floor tiles.

19. The method of claim 1, wherein the cured concentration of the nanostructure mixture is below a percolation limit of each of the at least two types of low-dimensional nanostructures within the polymer matrix.

* * * * *